3,076,694
PURGE PROCESS AND SYSTEM FOR A FLOW METER

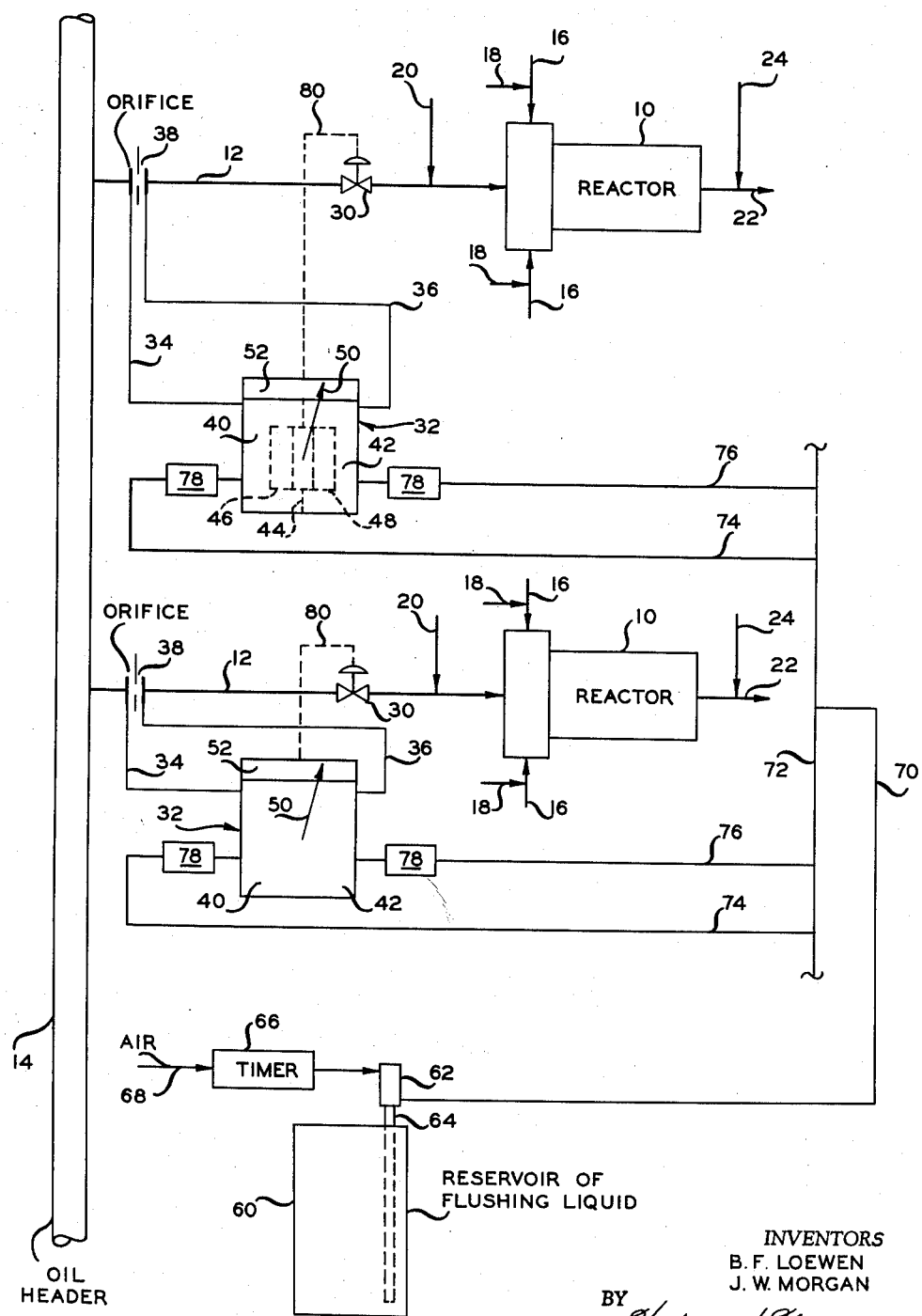

Bruno F. Loewen and John W. Morgan, Borger, Tex., assignors to Phillips Petroleum Company, a corporation of Delaware
Filed Nov. 23, 1959, Ser. No. 854,911
14 Claims. (Cl. 23—209.4)

This invention relates to a process and apparatus for purging a flow meter in a line carrying a liquid stream tending to deposit solid material in the legs of the flow meter. A specific aspect of the process pertains to a flushing or purging process and a system for maintaining the legs of a flow meter open when said flow meter is connected with an oil feed line to a carbon black reactor.

When a flow meter is utilized in a line carrying a liquid which tends to deposit solid material in the legs of the meter, difficulty is encountered when stoppage of one or both of the legs occurs. Such stoppage or interference with application of pressure thru the legs to the pressure-sensitive compartments of the flow meter results in interference with the control of flow in the line. In a carbon black process in which the invention has been utilized successfully, a heavy viscous oil is separately metered from a common oil header thru individual oil feed lines to each of several carbon black reactors. The individual oil feed lines are provided with a flow control valve which is air-operated and controlled by a flow meter, the legs of which connect with the oil feed line on opposite sides of an orifice therein. The oil is fed to the furnaces at a temperature in the range of about 175 to 325° F. and when some of this highly viscous oil enters the legs or tubes of the flow meter, the temperature of the migrated oil drops to substantially atmospheric temperature and becomes semi-solid to solid. Also, there is a tendency over a period of time for the oil to deposit sludge in the ends of the legs adjacent the oil feed line. This invention is concerned with a process or method and an arrangement of apparatus for flushing solid to semisolid material from the legs of the flow meter so as to maintain the flow meter in operating condition at all times, thereby maintaining the desired control of the flow control valve in the process feed line.

Accordingly, it is an object of the invention to provide a process and apparatus for maintaining the legs of a flow meter free of solid and semi-solid material when the flow meter is connected in a line carrying a liquid which tends to deposit such material in the legs of the flow meter. Another object is to provide a process and apparatus for positively flushing or purging the legs of a flow meter connected in a line in which plugging of the legs is a problem. A further object is to provide a process and apparatus for maintaining the legs of the flow meter free of solid oil deposit when the flow meter is connected in an oil feed line to one or more carbon black reactors. It is also an object of the invention to provide automatic high pressure purging system and process for purging the legs of a flow meter connected in a line carrying a liquid which tends to effect plugging of the legs. Other objects of the invention will become apparent upon consideration of the accompanying disclosure.

A broad aspect of the invention comprises periodically, at frequent intervals, injecting a purge or flushing liquid thru the legs of a flow meter into the line in which the meter is connected so as to flush out any solid or semi-solid material which has gathered in the end of the legs adjacent the line. The arrangement of apparatus utilized to effect the process comprises a reservoir of flushing liquid, a pump connected with the reservoir, and with a system of conduits leading to each compartment of the flow meter so as to force flushing liquid thru the compartment and leg connected therewith into the line thru which the process liquid is being passed. A preferred embodiment of the invention utilizes a metering valve in each conduit adjacent the compartment which it serves, so that upon operation of the pump and build up of pressure in the conduit system the metering valve positively injects a small metered amount of the flushing liquid into the compartment so as to displace an equal volume of the liquid therein which of necessity flows thru the meter leg into the process line.

A more complete understanding of the invention may be had by reference to the accompanying schematic drawing which shows a preferred embodiment of the invention as applied to a carbon black producing process.

Referring to the drawing, a series of carbon black reactors 10 are connected by an oil feed line 12 with an oil supply header 14 which is supplied with heavy oil at an elevated temperature so as to decrease the viscosity thereof and render the oil more flowable. Reactor 10 is provided with tangential air lines 16 and fuel lines 18. Air is usually fed into the axial oil line 12 thru line 20. Line 22 conveys the gaseous reactor effluent to conventional carbon black recovery equipment not shown. A water line 24 introduces quench water to line 22.

Flow of oil thru oil feed line 12 is controlled by an air operated motor valve 30. Flow meter 32 is connected by legs 34 and 36 with oil feed line 12 on opposite sides of orifice 38. Meter legs 34 and 36 connect with compartments 40 and 42, respectively, which are separate and distinct, being on opposite sides of a partition 44 in the flow meter. Pressure sensitive bellows boxes 46 and 48 in flow meter 32 are sensitive to pressures on opposite sides of orifice 38 and, as the differential pressure due to rate of flow in line 12 changes, the change indicates the rate of flow by movement of indicator 50 thru a linkage of levers in the flow meter (not shown). As the differential pressure changes, the signal put out by differential pressure controller 52 changes and this signal operating thru line 80 changes the setting of valve 30. In this manner air operated motor valve 30 either opens more or closes partially to maintain the desired or set flow rate thru line 12.

The foregoing arrangement of apparatus is conventional and represents a conventional application of a flow meter in combination with a motor valve to control the flow of fluid to a process. In combination with this apparatus thus far described, is a high pressure lubricating system adapted to inject a positive metered amount of flushing or purging liquid into the compartments of the flow meter at frequent intervals to purge the metal legs and prevent the plugging of these legs in the ends adjacent the oil line. This automatic high pressure lubricating system comprises a reservoir 60, an air-operated high pressure pump 62 having an intake conduit 64 leading into the reservoir, and an electrically-operated timer 66 in an air line 68 leading into pump 62. The outlet of pump 62 is connected by means of conduit 70 with a header 72 which runs along the line of reactors to serve individual flushing lines 74 and 76 leading into compartments 40 and 42 respectively. A metering valve 78 is positioned in each of the individual flushing lines to inject a positive metered amount of flushing fluid into the separate compartments of the flow meter upon each operation of pump 62.

The arrangement of apparatus illustrated in the drawing and just described has been successfully utilized on the oil feed lines of 84 reactors in carbon black plants.

The system has been substantially completely trouble free and outstandingly effective. The apparatus or equipment utilized in the purging or flushing system comprises an air-operated high pressure pump developing approximately 800 p.s.i.g. This pump is identical to that supplied by Alemite, a Division of Stewart-Warner Corp., 1826 Diversey Parkway, Denver, Colorado, and is identified as No. 7701–B–1. Metering valves 78 are obtainable from the same source and are identified as Type I valves available in 3 sizes; one with fixed capacity of .005, one adjustable from .005 to .015 cubic inch, and one adjustable from 0.15 to .050 cubic inch. The one utilized in our system was the second type valve adjustable from .005 to .015 which was set to meter .010 cubic inch of kerosene to its respective compartment and the frequency controlled by timer 66 was every 15 minutes. A 110 volt automatic timer control was connected in a high pressure air line supplying the pump. The reservoir was filled with kerosene. A Barton Model 199 flow meter and a Taylor recorder-controller were used. Every 15 minutes, air was applied to the pump which built up a pressure of about 800 p.s.i.g. and the valves were set to operate when this pressure was reached so as to meter the fixed amount of kerosene into each compartment, thereby forcing an equal amount of the kerosene thru the meter legs into the oil feed line.

The automatic timer control, the air operated pump, and the metering valves were all obtained and are all available from Alemite. However, similar automatic pressure lubricating systems are available from other manufacturers and suppliers. The invention is not limited to the use of any particular lubricating system, it being essential, however, that means for effecting a positive flow into the compartments and thru the legs of the flow meters be used. It is within the scope of the invention to inject the flushing fluid directly into the meter legs at a location close to the meter; but, it is more convenient and practical to attach the flushing tubing or conduit directly to the flow meter housing so that the injected liquid passes into the compartments of the flow meter.

The temperature of the oil in the oil feed lines to the various furnaces is usually in the range of about 175 to 325° F. in order to maintain the highly viscous feed in readily flowable conditions. When some of this oil finds its way into the meter legs and cools to near atmospheric temperature, the oil solidifies and becomes semi-solid so as to interfere with the sensitivity and effectiveness of the flow meter.

The invention is not limited to use on flow lines in which hot viscous feed is flowing. It is also applicable to lines carrying any kind of liquid which tends to deposit solid to semi-solid material in the entrances to the meter legs adjacent the flow line. In some instances the flushing fluid should be a solvent for the solid material. In the instant application to a hot oil flow line, the kerosene is an excellent flushing fluid since its volatility is sufficiently low and it is a good solvent for sludge and carbonaceous deposits which tend to form in the entrances to the flow legs. Other flushing liquids such as water, alcohols, esters, ethers, etc., may be utilized as flushing fluids for various applications.

The pressure in the oil feed line is generally in the range of 50 to 100 p.s.i.g. and this determines to some extent the pressure required in the flushing liquid supply line. Even without deposit of solid material in the openings to the legs, it would be necessary to apply a substantially greater pressure in the flushing liquid supply line than in the oil feed line in order to force liquid into the oil line against the pressure therein. The 800 p.s.i.g. pressure actually applied in practicing the invention is desirable in order to assure adequate pressure to force flushing fluid into the oil line when the highly viscous oil has solidified therein. While lower pressure might be utilized, it is essential to have a margin of safety to assure positive flow thru the metering legs. In other applications of the invention the pressure to be applied in the flushing liquid supply line will depend upon the character of the liquid in the line in which flow is being measured, the pressure thereof, and the character of the deposit.

Certain modifications of the invention will become apparent to those skilled in the art and the illustrative details disclosed are not to be construed as imposing unnecessary limitations thereon.

We claim:

1. Apparatus comprising in combination a plurality of carbon black reactors; an oil header extending along said reactors; a separate oil feed line extending axially into each reactor from said header; means for feeding air to each said reactor; an orifice in each said oil feed line; a flow meter for each oil feed line having a pair of separate pressure sensitive compartments connected by separate tubing to said oil feed line on opposite sides of said orifice; and an automatic high pressure periodically operating lubricating system connected with each said compartment in each meter, including a high pressure pump connected with a reservoir supplied with a relatively low viscosity flushing liquid, a flushing liquid supply line leading from said pump, a separate conduit from said supply line to each said compartment, a metering valve in each said separate conduit adapted to meter an amount of said liquid which is small with reference to the volume of said compartments and said tubing into its respective compartment upon build-up of pressure in said flushing liquid supply line while maintaining the respective flow meter operatively connected across the respective orifice; and means operatively associated with each of the flow meters responsive to the pressure in the compartments of the respective flow meter for continuously producing a signal representative of the differential pressure across the respective orifice, whereby said signal is produced even during the introduction of said liquid into the compartments of the respective flow meter.

2. The apparatus of claim 1 including a motor valve in each said oil feed line; and a controller for each flow meter sensitive thereto and in actuating control of its respective motor valve.

3. In a process for passing a liquid stream containing solidifiable material through a line at a controlled rate wherein flow in said line is sensed by a flow meter having separate pressure sensing compartments connected by separate conduits with said line each side of an orifice therein for determining differential pressure in said line; and wherein said separate conduits tend to become plugged by said material; the method of maintaining said separate conduits open to flow comprising filling said compartments and said separate conduits with a flushing liquid for said material; periodically metering through said separate conduits into said line an amount of said flushing liquid which is small with respect to the volume of said compartments and said separate conduits so as to keep said conduits open while maintaining said flow meter operatively connected across said orifice, and continuously producing a signal representative of said differential pressure, whereby said signal is produced even during the metering of said flushing liquid through said separate conduits.

4. The process of claim 3 wherein said liquid stream comprises a viscous oil and said flushing liquid comprises a light oil.

5. The process of claim 3 wherein said liquid stream comprises a highly viscous oil being metered to a carbon black reactor and said flushing liquid comprises a relatively light hydrocarbon.

6. The process of claim 5 wherein said light hydrocarbon is kerosene.

7. The process of claim 3 wherein said liquid stream is at an elevated temperature and cools after entering said separate conduits thereby becoming more viscous and plugging said separate conduits unless flushed therefrom before plugging occurs and wherein flushing is effected before plugging occurs.

8. The process of claim 7 wherein flushing is effected every 10 to 30 minutes.

9. The process of claim 3 wherein said solidifiable material deposits in the ends of said separate conduits adjacent said line and said flushing liquid is a solvent for said solidifiable material.

10. In a process for passing a liquid stream containing solidifiable material through a line at a controlled rate wherein flow in said line is sensed by a flow meter having separate pressure sensing compartments connected by separate conduits with said line each side of an orifice therein for determining differential pressure in said line; and wherein said separate conduits tend to become plugged by said material; the method of maintaining said separate conduits open to flow comprising filling said compartments and said separate conduits with a flushing liquid for said material, periodically injecting a metered amount of said flushing liquid into said compartments and through said separate conduits so as to keep said separate conduits open while maintaining said flow meter operatively connected across said orifice, said metered amount being small with respect to the volume of said compartments and said separate conduits, and continuously sensing the pressure in said pressure sensing compartments and producing a signal responsive thereto representative of said differential pressure whereby said signal is produced even during the injection of said flushing liquid into said compartments.

11. In a process for passing a highly viscous oil to a carbon black reactor through a line at a controlled rate wherein flow in said line is sensed by a flow meter having separate pressure sensing compartments connected by separate conduits with said line each side of an orifice therein for determining differential pressure in said line; and wherein said highly viscous oil is at an elevated temperature and cools after entering said separate conduits, thereby becoming more viscous and plugging said separate conduits unless flushed therefrom before plugging occurs; the method of maintaining said separate conduits open to flow comprising filling said compartments and said separate conduits with a flushing liquid for said highly viscous oil; metering through said separate conduits into said line an amount of said flushing liquid which is small with respect to the volume of said compartments and said conduits so as to keep said conduits open while maintaining said flow meter operatively connected across said orifice, and continuously producing a signal representative of said differential pressure, whereby said signal is produced even during the metering of said flushing liquid into said conduits.

12. Apparatus for maintaining the legs of a flow meter open when connected to a line on opposite sides of an orifice therein, said line carrying a liquid containing solidifiable material, comprising in combination a source of flushing fluid; a pressure pump having its inlet connected with said source; conduit means connecting the outlet of said pump with each of said legs at said flow meter; metering means in said conduit means for metering an amount of said flushing fluid into each of said legs upon each operation of said pump while maintaining said flow meter operatively connected across said orifice, said amount being small with respect to the volume of said legs of said flow meter; means for periodically operating said pump, and means for continuously producing a signal representative of the pressure differential across said orifice, whereby said signal is produced even during the metering of said flushing fluid into said legs.

13. Apparatus for maintaining the legs of a flow meter open when connected to a line on opposite sides of an orifice therein, said line carrying a liquid containing solidifiable material, said flow meter having a pair of separate pressure sensitive compartments connected by a pair of separate conduits with said line on opposite sides of said orifice; comprising in combination a source of flushing fluid, conduit means connecting said source with each of said compartments; metering valves in said conduit means adjacent each compartment; means for periodically actuating said metering valves to pass an amount of flushing fluid from said source through said conduit means into said compartments to force flushing fluid through said pair of separate conduits to maintain said pair of separate conduits free of solidified material while maintaining said flow meter operatively connected across said orifice, said amount being small with respect to the volume of said compartments and said separate conduits, and means responsive to the pressure in said compartments for continuously producing a signal representative of the differential pressure across said orifice, whereby said signal is produced even during the metering of said flushing fluid into said compartments.

14. Apparatus in accordance with claim 13 wherein said means for periodically actuating said metering valves comprises a compressed air operated pump in said conduit means; a compressed air supply line connected with said pump; a valve in said air supply line; a timer in control of said valve in said air supply line adapted to periodically open and close same at frequent intervals and wherein said metering valves are actuated at a predetermined high pressure in said conduit means effected by said pump.

References Cited in the file of this patent

UNITED STATES PATENTS

| | | |
|---|---|---|
| 2,770,248 | Audia | Nov. 13, 1956 |
| 2,817,237 | Stevens | Dec. 24, 1957 |
| 2,832,363 | Wood et al. | Apr. 29, 1958 |
| 2,883,271 | Pennington et al. | Apr. 21, 1959 |